United States Patent
Alberg et al.

(10) Patent No.: US 12,518,106 B2
(45) Date of Patent: Jan. 6, 2026

(54) SEMANTICALLY CLASSIFYING SETS OF DATA ELEMENTS

(71) Applicant: Oracle International Corporation, Redwood Shores, CA (US)

(72) Inventors: Dima Alberg, Arad (IL); Guy Shaked, Beer Sheva (IL)

(73) Assignee: Oracle International Corporation, Redwood Shores, CA (US)

(*) Notice: Subject to any disclaimer, the term of this patent is extended or adjusted under 35 U.S.C. 154(b) by 186 days.

(21) Appl. No.: 18/501,282

(22) Filed: Nov. 3, 2023

(65) Prior Publication Data

US 2025/0148211 A1    May 8, 2025

(51) Int. Cl.
  *G06F 40/30* (2020.01)
  *G06F 16/353* (2025.01)
  *G06F 21/60* (2013.01)

(52) U.S. Cl.
  CPC ............ *G06F 40/30* (2020.01); *G06F 16/353* (2019.01); *G06F 21/60* (2013.01)

(58) Field of Classification Search
  CPC ......... G06F 40/30; G06F 16/353; G06F 21/60
  See application file for complete search history.

(56) References Cited

U.S. PATENT DOCUMENTS

| | | | | |
|---|---|---|---|---|
| 10,885,902 B1* | 1/2021 | Papania-Davis | .... | G10L 15/1815 |
| 11,366,966 B1* | 6/2022 | Ramsey | ................ | G06F 40/295 |
| 11,663,182 B2* | 5/2023 | Emma | ..................... | G06N 3/006 |
| | | | | 706/55 |
| 11,755,626 B1* | 9/2023 | Liu | ...................... | G06F 16/2237 |
| | | | | 707/738 |
| 11,843,606 B2* | 12/2023 | Wu | ....................... | G06F 21/6263 |
| 12,062,368 B1* | 8/2024 | Arora | ..................... | G06N 20/00 |
| 2003/0126136 A1* | 7/2003 | Omoigui | ............... | G06F 16/958 |
| 2008/0103798 A1* | 5/2008 | Domenikos | ............ | G06Q 40/08 |
| | | | | 705/318 |
| 2010/0070448 A1* | 3/2010 | Omoigui | ............. | H10F 39/1825 |
| | | | | 706/55 |
| 2013/0185336 A1* | 7/2013 | Singh | .................. | G06F 16/3344 |
| | | | | 707/E17.127 |
| 2017/0365021 A1* | 12/2017 | Stading | ................ | G06Q 50/184 |
| 2019/0199745 A1* | 6/2019 | Jakobsson | ............. | H04L 51/212 |
| 2021/0089719 A1* | 3/2021 | Farmer | .................... | G06F 40/30 |
| 2021/0319340 A1* | 10/2021 | Shabtay | ................... | G06N 5/04 |
| 2022/0014543 A1* | 1/2022 | Jakobsson | ........... | H04L 63/1425 |
| 2022/0164472 A1* | 5/2022 | Cannon | ................... | G06F 21/6245 |
| 2022/0269663 A1* | 8/2022 | Raphael | .............. | G06F 16/2282 |
| 2023/0315844 A1* | 10/2023 | Roytman | ............... | G06F 16/353 |
| | | | | 726/23 |

(Continued)

*Primary Examiner* — Kevin Ky
(74) *Attorney, Agent, or Firm* — Invoke

(57) ABSTRACT

One or more embodiments include operations associated with semantic classification of data columns. The operations may include receiving a set of data elements corresponding to a data column to be semantically classified, applying a machine learning model to the set of data elements to predict a set of candidate semantic types for the set of data elements, selecting a particular semantic type from the set of candidate semantic types based at least in part on a semantic fit score corresponding to the particular semantic type predicted by the machine learning model, and presenting the particular semantic type as a recommended semantic classification for the data column.

39 Claims, 5 Drawing Sheets

(56) References Cited

U.S. PATENT DOCUMENTS

| | | | |
|---|---|---|---|
| 2023/0334246 A1* | 10/2023 | Vah | G06F 40/30 |
| 2024/0005034 A1* | 1/2024 | Raju | G06F 21/6245 |
| 2024/0160607 A1* | 5/2024 | Rossiello | G06F 16/16 |
| 2024/0346252 A1* | 10/2024 | Budowski-Tal | G06F 40/30 |
| 2025/0148211 A1* | 5/2025 | Alberg | G06F 21/60 |

* cited by examiner

| | | |
|---|---|---|
| Date | Metals and Mining | Women's Health |
| Time | Printing and Publishing | Crafts |
| Email address | Textiles and Nonwovens | Outdoors |
| Event | Transportation and Logistics | Water Activities |
| Facility | Computer Hardware | Bed and Bath |
| Geopolitical Entity | Computer Security | Gardening and Landscaping |
| Geographical Location | Consumer Electronics | Home Furnishings |
| City | Electronics and Electrical | Home Improvement |
| State | Enterprise Software | Kitchen and Dining |
| Country | Programming | Yard and Patio |
| Currency | Software | Hotels and Accommodations |
| Quantity | Education | Personal Travel |
| Number | Jobs | Communications Equipment |
| Percentage | Celebrities and Famous Personalities | Email and Messaging |
| Nationality | Comics and Animation | Service Providers |
| Religious Group | Events and Listings | Web Services |
| Political Group | Film Industry | Real Estate Listings |
| Physical Address —302 | Humor | Consumer Resources |
| Person | Movies | Department Stores |
| Given Name | Accounting and Auditing | Gifts and Special Event Items |
| Surname | Banking | Biology |
| Phone Number | Credit and Lending | Chemistry |
| Product | Financial Planning and Management | Computer Science |
| URL | Grants, Scholarships and Financial Aid | Earth Sciences |
| Pets | Investing | Ecology and Environment |
| Business Organization | Fashion and Style | Engineering |
| Audio and Music | Weight Loss | Mathematics and Statistics |
| Performing Arts | Cooking and Recipes | Physics |
| Visual Art and Design | Drinks and Beverages | Social Science |
| Bicycles and Accessories | Food | Family and Relationships |
| Boats and Watercraft | Grocery Retailers | Kids and Teens |
| Motor Vehicles | Restaurants | Religion and Belief |
| Vehicle Parts and Services | Government | Social Issues and Advocacy |
| Vehicle Shopping and Renting | Legal | Animal Sports |
| Children's Literature | Military | Board Games |
| E-Books | Public Safety | Card Games |
| Poetry | Social Networks | Combat Sports |
| Advertising and Marketing | Aging and Geriatrics | Computer and Video Games |
| Agriculture and Forestry | Conditions and Disease | Individual Sports |
| Business Operations | Medical Facilities and Services | International Sports Competitions |
| Business Services | Mental Health | Motor Sports |
| Construction and Maintenance | Nursing | Table Games |
| Defence | Nutrition | Team Sports |
| Energy and Utilities | Oral and Dental Care | Water Sports |
| Manufacturing | Pharmacy | Winter Sports |

FIG. 3A

SEMANTICALLY CLASSIFYING SETS OF DATA ELEMENTS

TECHNICAL FIELD

The present disclosure relates to semantically classifying sets of data elements. More particularly, the present disclosure relates to the use of machine learning models to semantically classifying sets of data elements.

BACKGROUND

Data elements in a database may be classified based on semantic type. For example, a database may include a set of columns, and each column may include a set of data elements. A semantic type may be assigned to the column to represent the set of data elements in the column. The semantic type of the column may be utilized to determine what type of data the column represents. Additionally, or in the alternative, the semantic type of the column may be utilized for schema matching, data cleansing, or other database operations. A semantic type may be determined for a data element based on regular expressions or lookup tables. However, the use of regular expressions or lookup tables to semantically classify sets of data elements may be resource intensive. Additionally, the semantic type of individual data elements in a column may not necessarily be representative of the semantic type of the set of data elements as a whole.

The content of this background section should not be construed as prior art merely by virtue of its presence in this section.

BRIEF DESCRIPTION OF THE DRAWINGS

The embodiments are shown by way of example and not by way of limitation in the figures of the accompanying drawings. It should be noted that references to "an" or "one" embodiment in this disclosure are not necessarily to the same embodiment, and they mean at least one. In the drawings:

FIG. 3A illustrates an example semantic-type dataset that may be utilized by a semantic classification management system in operations associated with semantic classification of sets of data elements in accordance with one or more embodiments;

DETAILED DESCRIPTION

In the following description, for the purposes of explanation, numerous specific details are set forth in order to provide a thorough understanding. Detailed examples are described below for purposes of clarity. One or more embodiments may be practiced without these specific details. Components and/or operations described below should be understood as one specific example which may not be applicable to certain embodiments. Features described in one embodiment may be combined with features described in a different embodiment. In some examples, well-known structures and devices are described with reference to a block diagram form in order to avoid unnecessarily obscuring the present invention. Components and/or operations described below should not be construed as limiting the scope of any of the claims.

1. GENERAL OVERVIEW
2. EXAMPLE SEMANTIC CLASSIFICATION SYSTEM
3. EXAMPLE SEMANTIC CLASSIFICATION OPERATIONS
4. EXAMPLE SEMANTIC CLASSIFICATION RECOMMENDATIONS
5. EXAMPLE PRACTICAL APPLICATIONS
6. COMPUTER NETWORKS AND CLOUD NETWORKS
7. MICROSERVICE APPLICATIONS
8. HARDWARE OVERVIEW
9. MISCELLANEOUS; EXTENSIONS

1. GENERAL OVERVIEW

One or more embodiments apply a machine learning model to data elements corresponding to a data column to predict a semantic classification for the data column. A system applies a machine learning model to predict a semantic type for individual data elements in a set of data elements within a data column. The system uses the semantic types, predicted for individual data elements, to identify a candidate set of semantic types for the data column. The system determines a semantic fit score for the respective candidate semantic types. The semantic fit score for a candidate semantic type may be based on, for example, a number of data elements in the data column that were predicted to correspond to that candidate semantic type. The system selects a particular semantic type from the set of candidate semantic types based at least in part on the semantic fit score corresponding to the particular semantic type. The system presents the particular semantic type as a recommended semantic classification for the data column. The semantic types recommended by the system may provide improved data management operations, such as identification of personal information, schema matching, or data cleansing.

This General Overview section is intended to provide a general overview without addressing all aspects of the present disclosure. The full scope of the presently disclosed subject matter is understood from the content of the present disclosure in its entirety.

2. EXAMPLE SEMANTIC CLASSIFICATION SYSTEM

Figure 1:
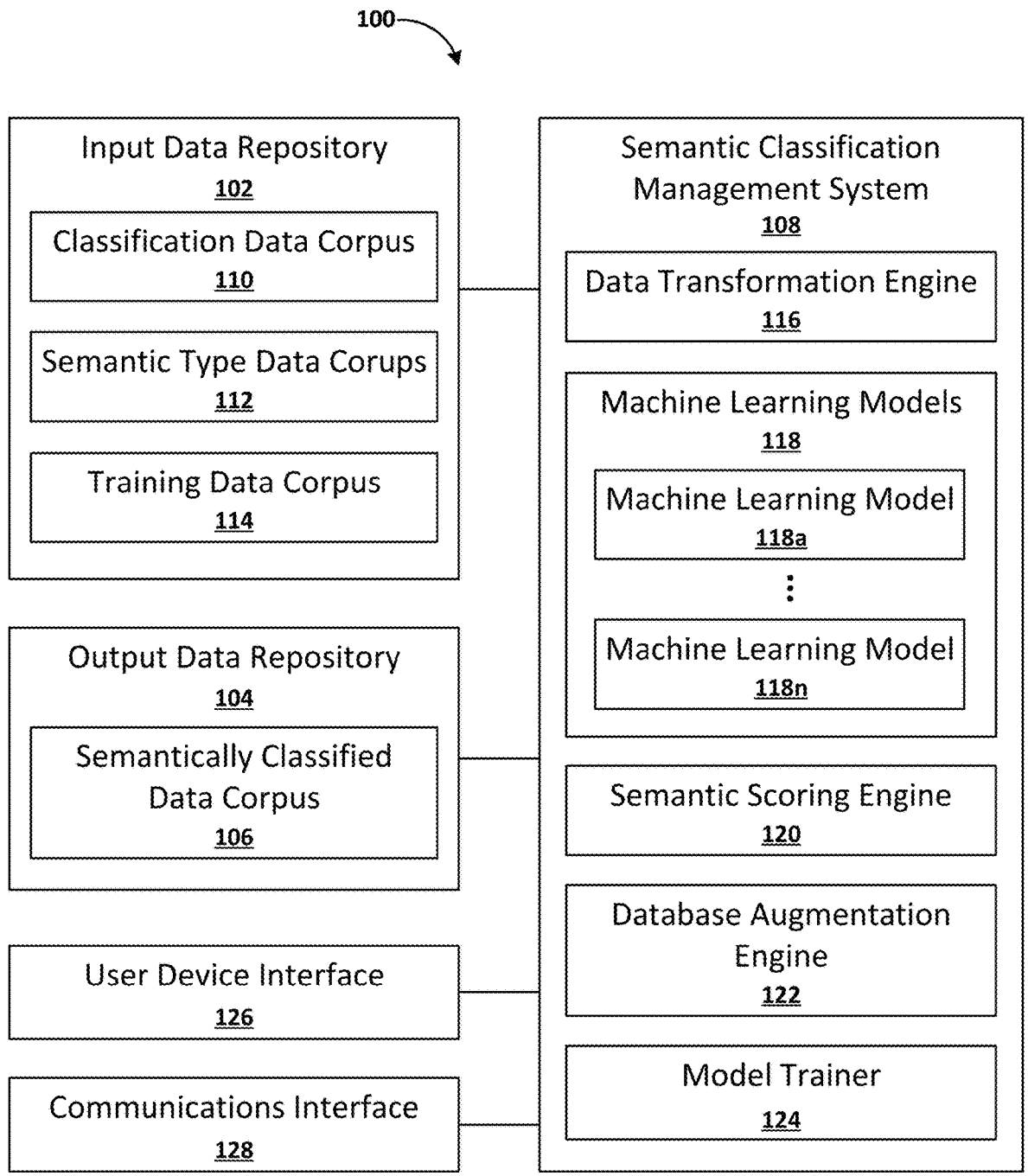
FIG. 1 illustrates an example system that includes a semantic classification management system for semantically classifying sets of data elements, in accordance with one or more embodiments.

Referring now to FIG. 1, example systems are described. An example system may be utilized to perform operations associated with semantic classification of data elements, such as data elements stored in columns. An example system may recommend a semantic classification for a data column based on a semantic type predicted for the data column using a machine learning model. Additionally, the system may select the recommended semantic classification as a selected semantic classification for the data column.

As used herein, the term "semantic type" refers to a category or class that may represent a semantic meaning of a set of data elements. As used herein, the term "semantic meaning" refers to an underlying concept associated with a data element. The semantic meaning of a data element may include a definition, a connotation, a denotation, an interpretation, an understanding, a category, a label, a sense, a purpose, and/or a context associated with the data element. As used herein, the term "semantic classification" refers to a semantic type that may represent a data column that includes the set of data elements. The semantic classification may include a recommended semantic classification for the data column. A recommended semantic classification may include a semantic classification presented by a machine learning model to represent the data column. The semantic classification may include a selected semantic classification for the data column. A selected semantic classification may include a recommended semantic classification that is selected to represent the data column.

As used herein, the term "semantic fit" refers to the degree to which a semantic type accurately represents or corresponds to a set of data elements. In one example, the set of data elements may correspond to a data column to be semantically classified. The term semantic fit may represent the extent to which a semantic type captures the meaning and context of the set of data elements. The term semantic fit may represent the extent to which a semantic type aligns with the actual information being represented. The semantic fit of a predicted semantic type may be quantified by a semantic fit score, for example, as described herein. A semantic type that has a higher semantic fit score may indicate a higher degree of correspondence between the semantic type and the set of data elements relative to other semantic types that have a lower semantic fit score. Additionally, or in the alternative, a semantic type that has a higher semantic fit score may indicate a more accurate or more appropriate representation relative to other semantic types that have a lower semantic fit score.

A. Example System Components.

As shown in FIG. 1, a system 100 in accordance with one or more embodiments may include an input data repository 102, an output data repository 104, and a semantic classification management system 108. The input data repository 102 may include data inputs to the semantic classification management system 108. The output data repository 104 may include data outputs from the semantic classification management system 108. The semantic classification management system 108 may perform semantic classifications based on data inputs from the input data repository.

The input data repository 102 may include a classification data corpus 110. The classification data corpus 110 may include one or more datasets for semantic classification. The one or more datasets may respectively include a set of data elements. Additionally, or in the alternative, a set of data elements may be extracted or derived from a dataset. The one or more datasets may be stored in the classification data corpus 110 for the purpose of semantic classification. Additionally, or in the alternative, the classification data corpus 110 may exist for a purpose other than semantic classification of the one or more datasets stored therein. A dataset stored in the classification data corpus 110 may include at least one of: a database, a spreadsheet, a table, a comma-separated values file, a tab-separated values file, a JSON file, an XML file, an Excel file, an SQL table, a log file, a web scraped data file, a text file, a time series file, a document.

Additionally, or in the alternative, the one or more datasets stored in the classification data corpus 110 may include one or more cloud storage datasets. For example, the classification data corpus may include datasets stored on a cloud storage platform.

In one example, the classification data corpus 110 may include a database, such as a structured database or an unstructured database. A structured database may include one or more datasets that are organized in a well-defined structure. A structured database may impose a schema that specifies a structure for how data may be organized within the database. For example, a structured database may include tables, rows, and/or columns. Additionally, or in the alternative, the schema of a structured database may define one or more of: a layout of the database, one or more data types included in the database, relationships between subsets of database, or constraints of the data stored in the database. In one example, a column of a structured database may represent a specific data type, a particular attribute, or a particular field. In one example, a row of a structured database may include a unique record with values corresponding to the data type, attribute, or field, of one or more of the respective columns. In one example, a structured database may include a relational database. A relational database may include one or more datasets stored in a collection of related tables. The relationships between these tables are defined by keys, usually primary keys and foreign keys. Relational databases are based on the principles of the relational model, which emphasizes the relationships between entities. SQL (Structured Query Language) is commonly used to manage and query data in relational databases. These databases are widely used for their ability to ensure data integrity, enforce relationships, and support complex querying. An unstructured database may include one or more datasets that lack a predefined structure. An unstructured database may include one or more datasets that lack a schema. All or a portion of an unstructured database may be schemaless. A schemaless portion of a database may store data without a predefined structure. An unstructured database may allow for flexible or dynamic storage of data, for example, by way of documents, key-value pairs, graphs, or other formats.

In one example, the input data repository 102 may include a semantic type data corpus 112. The semantic type data corpus 112 may include one or more semantic-type datasets. A semantic-type dataset may include a plurality of semantic types that may be selected as candidate semantic types for various data elements. In one example, a semantic-type dataset may include a plurality of semantic type subsets.

In one or more embodiments, the input data repository 102 may include any type of storage unit and/or device (e.g., a file system, database, collection of tables, or any other storage mechanism) for storing data. Further, the input data repository 102 may include multiple different storage units and/or devices. The multiple different storage units and/or devices may or may not be of the same type or located at the same physical site. Further, the input data repository 102 may be implemented or executed on the same computing system as the semantic classification management system 108. Additionally, or in the alternative, the input data repository 102 may be implemented or executed on a computing system separate from the semantic classification management system 108.

The output data repository 104 may include a semantically classified data corpus 106. The semantically classified data corpus 106 may include recommended or selected semantic classifications for data columns from the classification data corpus 110. Additionally, or in the alternative, the semantically classified data corpus 106 may include the data columns corresponding to the recommended or selected semantic classifications. Additionally, or in the alternative, the semantically classified data corpus 106 may include sets of candidate semantic types for respective data elements corresponding to a respective data column, and/or selected semantic types for the respective data elements corresponding to the respective data column. In one example, the semantically classified data corpus 106 may include one or more metadata files that respectively identify a semantic classification for one or more data columns of a dataset from the classification data corpus 110.

Referring further to FIG. 1, the semantic classification management system 108 may include a data transformation engine 116 and one or more machine learning models 118. A data transformation engine 116 may be a component of a machine learning model 118. Additionally, or in the alternative, a data transformation engine 116 may be a component of the semantic classification management system 108 that is separate from one or more machine learning models 118. The data transformation engine 116 may obtain sets of data elements to be semantically classified. The data transformation engine 116 may provide the sets of data elements to one or more of the machine learning models 118. In one example, the data transformation engine 116 may obtain the sets of data elements from the classification data corpus 110. A set of data elements obtained by the data transformation engine 116 may correspond to a data column to be semantically classified. The data column may represent at least a portion of a dataset from the classification data corpus 110.

In one example, the data transformation engine 116 may perform one or more transformation operations upon data, such as data obtained from the classification data corpus 110. The one or more transformation operations may generate a data column to be semantically classified. Additionally, or in the alternative, the one or more transformation operations may generate the set of data elements corresponding to the data column to be semantically classified. In one example, the one or more transformation operations performed by the data transformation engine 116 may include extracting a data column from a dataset.

In one example, the data transformation engine 116 may extract structured data from the classification data corpus 110 and transform the structured data into unstructured data. The transformation engine may generate a set of data elements corresponding to a data column to be semantically classified at least in part by transforming structured data, such as a data column, into unstructured data. The data transformation engine 116 may provide the unstructured data to one or more of the machine learning models 118. The unstructured data may include a set of data elements corresponding to a data column to be semantically classified. The transformation engine 116 may concatenate the set of data elements into a string of data elements. The transformation engine 116 may provide a set of data elements to a machine learning model 118 for each column of the dataset.

The semantic classification management system 108 may include one or more machine learning models 118, such as machine learning model 118*a* and machine learning model 118*n*. In one example, the semantic classification management system 108 may utilize different machine learning models 118 for different types of data. In one example, outputs of a plurality of machine learning models 118 may be aggregated to provide a combined, aggregate output. The use of a plurality of machine learning models 118 may enhance robustness of the semantic classifications generated by the semantic classification management system 108.

A machine learning model 118 may receive a set of data elements from the transformation engine 116. The set of data elements may correspond to a data column to be semantically classified. The machine learning model 118 may predict a set of candidate semantic types for the set of data elements. The set of candidate semantic types may include at least one candidate semantic type for each data element of the set of data elements. In one example, the machine learning model 118 may predict a particular candidate semantic type for a particular data element. Additionally, or in the alternative, the machine learning model 118 may predict a plurality of candidate semantic type for a particular data element.

In one example, a machine learning model 118 may output an occurrence frequency for the semantic types predicted by the machine learning model 118. The occurrence frequency for a particular semantic type may represent a frequency with which the particular semantic type occurs within the set of candidate semantic types predicted by the machine learning model 118 for a respective set of data elements. Additionally, or in the alternative, the machine learning model 118 may output a confidence level for the semantic types predicted by the machine learning model 118. The confidence level for a particular semantic type may represent a degree of confidence that the particular semantic type predicted for a particular data element accurately represents a semantic meaning of the particular data element. Additionally, or in the alternative, the confidence level may represent a probability that the particular semantic type predicted for a particular data element accurately represents a semantic meaning of the particular data element. In one example, the machine learning model 118 may output one or more candidate semantic types for each particular data element of the set of data elements and a corresponding confidence level for each of the one or more candidate semantic types.

In one example, the semantic classification management system 108 may include a semantic scoring engine 120. A semantic scoring engine 120 may be a component of a machine learning model 118. Additionally, or in the alternative, a semantic scoring engine 120 may be a component of the semantic classification management system 108 that is separate from one or more machine learning models 118. In one example, the semantic scoring engine 120 may determine the occurrence frequency and/or the confidence level for the semantic types predicted by a machine learning model 118. Additionally, or in the alternative, the semantic scoring engine 120 may generate semantic fit scores corresponding to the semantic types predicted by the machine learning model 118.

The semantic scoring engine 120 may select a particular semantic type from a set of candidate semantic types based at least in part on the semantic fit score corresponding to the particular semantic type predicted by the machine learning model 118. The semantic fit score may be based at least in part on an occurrence frequency of the particular semantic type in the set of candidate semantic types predicted by the machine learning model 118. Additionally, or in the alternative, the semantic fit score may be based at least in part on a confidence level corresponding to the particular semantic type in the set of candidate semantic types predicted by the machine learning model 118. In one example, the semantic scoring engine 120 may select a particular semantic type that has a highest semantic fit score from among a set of candidate semantic types.

In one example, the particular semantic type may be selected from the set of candidate semantic types based at least in part on a threshold occurrence frequency. The semantic scoring engine 120 may determine that an occurrence frequency of a particular semantic type meets a threshold occurrence frequency. The semantic scoring engine 120 may select the particular semantic type from the set of candidate semantic types based at least in part on the occurrence frequency meeting the threshold occurrence frequency. In one example, a plurality of particular semantic types may meet the threshold occurrence frequency, and the semantic scoring engine 120 may select each of the particular semantic types that meet the threshold occurrence frequency.

In one example, the particular semantic type may be selected from the set of candidate semantic types based at least in part on a confidence level corresponding to the particular semantic type. The semantic scoring engine 120 may determine that the confidence level for the particular semantic type meets a threshold confidence level. The semantic scoring engine 120 may select the particular semantic type from the set of candidate semantic types based at least in part on the confidence level meeting the threshold confidence level. In one example, the confidence level of a plurality of the particular semantic types may meet the threshold confidence level, and the semantic scoring engine 120 may select each of the particular semantic types that have a confidence level that meets the threshold confidence level.

In one example, the semantic scoring engine 120 may determine a candidate semantic fit score for each candidate semantic type of the set of candidate semantic types. The semantic scoring engine 120 may select a candidate semantic type as the particular semantic type based at least in part on the candidate semantic fit score being the highest candidate semantic fit score with respect to the set of candidate semantic types.

In one example, the semantic scoring engine 120 may determine a candidate semantic fit score for a particular candidate semantic type, x based at least in part on relationship (1), as follows:

$$F(x) = \frac{\sum C_{(x)}}{\sum C_{(1 \to n)}}, \qquad (1)$$

where F(x) is the semantic fit score of the particular candidate semantic type, x; where $\sum C_{(x)}$ is the sum of each instance of $C_{(x)}$, where $\sum C_{(x)}$ is the sum of the confidence levels of the particular candidate semantic type, x assigned to one or more of the particular data elements; where $\sum C_{(1 \to n)}$ is the sum of the confidence levels of each of n-number of particular candidate semantic type assigned to one or more of the particular data elements. In accordance with relationship (1), the semantic scoring engine 120 may compute, for each particular data element of the set of data elements, a confidence level for the particular candidate semantic type predicted for the particular data element. The semantic scoring engine 120 may compute a denominator that includes the sum of each particular confidence level, for each of the candidate semantic types, corresponding to each particular data element of the set of data elements. For a particular candidate semantic type, the semantic scoring engine 120 may compute a numerator that includes the sum of each particular confidence level corresponding to each occurrence of the particular candidate semantic type having been predicted. The semantic scoring engine 120 may determine a candidate semantic fit score for the particular candidate semantic type by computing a quotient that includes the aforementioned numerator divided by the aforementioned denominator. The semantic scoring engine 120 may select a particular semantic type from a set of candidate semantic types based at least in part on a semantic fit score corresponding to the particular semantic type. In one example, the semantic scoring engine 120 may select the particular semantic type based on having the highest candidate semantic fit score with respect to the set of candidate semantic types. The semantic scoring engine 120 may present the selected semantic type as a recommended semantic classification for the data database column.

In one example, the semantic scoring engine 120 may determine a candidate semantic type and a corresponding confidence level for a set of data elements, as shown in Table 1:

TABLE 1

Example Candidate Semantic Types and Confidence Levels

| Data Element | Candidate Semantic Type | Confidence Level |
|---|---|---|
| A | ST1 | 0.7 |
| B | ST1 | 0.2 |
| C | ST2 | 0.9 |
| D | ST2 | 0.4 |
|   | ST3 | 0.6 |
| E | ST1 | 0.5 |
|   | ST2 | 0.8 |
| F | ST3 | 0.3 |

In one example, based on the candidate semantic types and a corresponding confidence levels in Table 1, the semantic scoring engine 120 may determine a candidate semantic fit score for each candidate semantic type, as shown in Table 2:

TABLE 2

Example Candidate Semantic Fit Scores

| Candidate Semantic Type | $\Sigma C_{(x)}$ | $\Sigma C_{(1 \to n)}$ | Candidate Semantic Fit Score |
|---|---|---|---|
| ST1 | 0.7 + 0.2 + 0.5 = 1.4 | 0.7 + 0.2 + 0.9 + 0.4 + 0.6 + 0.5 + 0.8 + 0.3 = 4.4 | 1.4/4.4 = 0.32 |
| ST2 | 0.9 + 0.4 + 0.8 = 2.1 | 0.7 + 0.2 + 0.9 + 0.4 + 0.6 + 0.5 + 0.8 + 0.3 = 4.4 | 2.1/4.4 = 0.48 |
| ST3 | 0.6 + 0.3 = 0.9 | 0.7 + 0.2 + 0.9 + 0.4 + 0.6 + 0.5 + 0.8 + 0.3 = 4.4 | 0.9/4.4 = 0.2 |

In one example, based on the candidate semantic fit scores in Table 2, the semantic scoring engine 120 may select a candidate semantic type as a recommended semantic classification for the set of data elements, as shown in Table 3. For the example shown in Table 3, the semantic scoring engine 120 has selected candidate semantic type ST2 as the recommended semantic classification:

TABLE 3

Semantic Type Example Set of Data Elements

| Candidate Semantic Type | Candidate Semantic Fit Score | Recommended semantic classification |
|---|---|---|
| ST1 | 0.32 | No |
| ST2 | 0.48 | Yes |
| ST3 | 0.20 | No |

The recommended semantic classification may be stored in the output data repository 104, such as in the semantically classified data corpus 106. In one example, the semantic scoring engine 120 may select a particular candidate semantic type as a recommended semantic classification for the data database column based on a semantic fit score for the particular candidate semantic type meeting a threshold semantic fit score. The semantic scoring engine 120 may determine a particular semantic fit score corresponding to the particular candidate semantic type, for each particular candidate semantic type of a set of candidate semantic types. The semantic scoring engine 120 may compare each particular semantic fit score to a threshold semantic fit score, and the semantic scoring engine 120 may select a particular semantic type from the set of candidate semantic types based at least in part on the particular semantic type meeting the threshold semantic fit score. In one example, each of a plurality of particular semantic types may meet the threshold semantic fit score, and, based at least in part meeting the threshold semantic fit score, the semantic scoring engine 120 may select each of the plurality of particular semantic types as a candidate recommended semantic classifications for the data column. In one example, each of the candidate recommended semantic classifications may be presented as a recommended semantic classification. Alternatively, a recommended semantic classification may be selected from the candidate recommended semantic classifications, for example, based at least in part on the semantic fit score.

In one example, the semantic classification management system 108 may include a database augmentation engine 122. The database augmentation engine 122 may augment datasets based on outputs from the semantic scoring engine 120 and/or one or more machine learning models 118. In one example, the database augmentation engine 122 may add semantic classifications to database columns of datasets from the classification data corpus 110. The semantic classifications may be added to datasets stored in the classification data corpus 110. Additionally, or in the alternative, the database augmentation engine 122 may generate new datasets that include semantic classifications added to datasets from the classification data corpus 110. The new datasets may be stored in the semantically classified data corpus 106 of the output data repository 104. Additionally, or in the alternative, the database augmentation engine 122 may generate metadata files that respectively identify a semantic classification for one or more data columns of a dataset from the classification data corpus 110. The database augmentation engine 122 may store the metadata files in the semantically classified data corpus 106.

B. Example Model Algorithms.

As mentioned, the semantic classification management system 108 may utilize one or more machine learning models 118. A machine learning model 118 may include one or more machine-learning algorithms configured to automatically learn relevant patterns and relationships in data, for example, without the need for manual feature selection or strong assumptions about the data distribution. In addition, or in the alternative, to a machine learning model 118, the semantic classification management system 108 may utilize one or more classical models, for example, to predict a set of candidate semantic types for the set of data elements, to generate semantic fit scores, and/or to selecting particular semantic types from sets of candidate semantic types based at least in part on the semantic fit score. A classical model may include one or more classical statistical algorithms that rely on a set of assumptions about one or more of the underlying data, the data generating process, or the relationships between the variables. Example classical statistical algorithms may include linear regression, logistic regression, ANOVA (analysis of variance), or hypothesis testing.

In one or more embodiments, a machine learning model 118 may include one or more machine learning algorithms that can be iterated to learn a target model f that best maps a set of input variables to an output variable. In particular, a machine learning algorithms may be configured to generate and/or train a machine learning model 118. A machine learning algorithm may be iterated to learn a target model f that best maps a set of input variables to an output variable, using a set of training data. Training data used by a machine learning algorithm may be stored in a training data corpus 114, for example, in the input data repository 102. The training data may include datasets and associated labels. The datasets may be associated with input variables for the target model f. The associated labels may be associated with the output variable of the target model f. The training data may be updated based on, for example, feedback on the accuracy of the current target model f. Updated training data may be fed back into the machine learning algorithms, which in turn updates the target model f.

A machine learning algorithm may generate a target model f such that the target model f best fits the datasets of training data to the labels of the training data. Additionally, or alternatively, a machine learning algorithm may generate a target model f such that when the target model f is applied to the datasets of the training data, a maximum number of results determined by the target model f matches the labels of the training data. Different target models may be generated based on different machine learning algorithms and/or different sets of training data.

A machine learning algorithm may include supervised algorithms and/or unsupervised algorithms. Various types of algorithms may be used, such as linear regression, logistic regression, linear discriminant analysis, classification and regression trees, naïve Bayes, k-nearest neighbors, learning vector quantization, support vector machine, bagging, and random forest, boosting, backpropagation, and/or clustering.

In one or more embodiments, as shown in FIG. 1, the system 100 may include a model trainer 124 that includes one or more machine learning algorithms configured to generate and/or train a machine learning model 118. The model trainer 124 may be included as part of the semantic classification management system 108. Alternatively, the model trainer 124 may represent a component of the system 100 that is separate from the semantic classification management system 108.

In one example, the model trainer 124 may obtain and/or generate feedback from one or more of the machine learning models 118. The feedback may correspond to one or more outputs of a machine learning model 118. The model trainer 124 may train, update, and/or retrain one or more of the machine learning models 118 based at least in part on the feedback. The feedback may correspond to one or more outputs of at least one machine learning model 118. The one or more outputs of the machine learning model 118 may include one or more sets of candidate semantic types predicted by the machine learning model 118. Additionally, or in the alternative, one or more outputs of the machine learning model 118 may include one or more particular semantic types presented as a recommended semantic classification for a data column. For example, the one or more outputs may include at least one recommended semantic classification for each of a plurality of data columns.

In one example, the model trainer 124 may obtain a plurality of training datasets, such as from the training data corpus 114. The model trainer 124 may train a machine learning model 118 utilized by the semantic classification management system 108 based at least in part on the plurality of training datasets. The plurality of training datasets may respectively include datasets from the classification data corpus 110. The training datasets may include datasets with columns that have known or pre-assigned semantic classifications. Additionally, or in the alternative, the training datasets may include sets of data elements that have known or pre-assigned semantic types corresponding to respective data elements. Additionally, or in the alternative, the training datasets may include occurrence frequencies, confidence levels, and/or semantic fit scores corresponding to semantic types assigned to the data elements.

In one example, the training data may include outputs from one or more of the machine learning models 118. For example, a machine learning model 118 may be iteratively trained and/or re-trained based at least in part on outputs generated by one or more of the machine learning models 118. A machine learning model 118 may be iteratively improved over time as additional datasets are analyzed by the machine learning model 118 to produce additional outputs, and the machine learning model 118 is iteratively trained or re-trained based on the additional outputs.

In one example, the training data may include one or more initial supervised learning datasets. The model trainer 124 may train a machine learning model 118 based at least in part on the one or more initial supervised learning datasets. For example, the model trainer 124 may initially train the machine learning model 118 to predict candidate semantic types for data elements based on the one or more initial supervised learning datasets. In one example, the training data may include one or more subsequent supervised learning datasets. The model trainer 124 may update or retrain the machine learning model 118 based on one or more subsequent supervised learning datasets. The one or more subsequent supervised learning datasets may be generated based at least in part on feedback corresponding to one or more outputs of the machine learning model 118, such as one or more sets of candidate semantic types predicted by the machine learning model 118, and/or one or more particular semantic types respectively presented as a recommended semantic classification by the machine learning model 118, for example, with respect to one or more data columns. In one example, the feedback may include data associated with occurrence frequencies and/or confidence levels corresponding to candidate semantic types predicted by the machine learning model 118. Additionally, or in the alternative, the feedback may include data associated with occurrence frequencies and/or confidence levels corresponding to particular semantic types presented as recommended semantic classifications by the machine learning model 118. Additionally, or in the alternative, the feedback may include data corresponding to user scores for candidate semantic types predicted by the machine learning model 118 and/or particular semantic types presented as recommended semantic classifications by the machine learning model 118. The data corresponding to user scores may be stored in the training data corpus 114.

C. Example System Interfaces.

Referring again to FIG. 1, the system 100 may include a user device interface 126 communicatively coupled or couplable with the semantic classification management system 108. The user device interface 126 may include hardware and/or software configured to facilitate interactions between a user and various aspects of the system 100. The user device interface 126 may render user interface elements and receive input via user interface elements. For example, the user device interface 126 may display outputs generated by the semantic classification management system 108, such as outputs from one or more machine learning models 118, outputs from the semantic scoring engine 120, and/or outputs from the database augmentation engine 122. Additionally, or in the alternative, the user device interface 126 may be configured to select datasets as inputs to the semantic classification management system 108, such as from the classification data corpus 110. Examples of interfaces include a GUI, a command line interface (CLI), a haptic interface, or a voice command interface. Examples of user interface elements include checkboxes, radio buttons, drop-down lists, list boxes, buttons, toggles, text fields, date and time selectors, command lines, sliders, pages, or forms. Any one or more of these interfaces or interface elements may be utilized by the user device interface 126.

In an embodiment, different components of a user device interface 126 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user device interface 126 may be specified in one or more other languages, such as Java, C, or C++.

Referring again to FIG. 1, the system 100 may include at least one communications interface 128 communicatively coupled or couplable with the semantic classification management system 108 and/or the input data repository 102. The at least one communications interface 128 may include hardware and/or software configured to transmit data between respective components of the system 100 and/or to transmit data to and/or from the system 100. For example, a communications interface 128 may transmit and/or receive data between and/or among one or more of: the semantic classification management system 108, and the input data repository 102, or the user device interface 126.

In one example, the semantic classification management system 108 and/or the input data repository 102 may be respectively implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a browser device.

In one or more embodiments, the system 100 may include more or fewer components than the components described with reference to FIG. 1. The components described with reference to FIG. 1 may be local to or remote from each other. The components described with reference to FIG. 1 may be implemented in software and/or hardware. Each component may be distributed over multiple applications and/or machines. Multiple components may be combined into one application and/or machine. Operations described with respect to one component may instead be performed by another component.

3. EXAMPLE SEMANTIC CLASSIFICATION OPERATIONS

Figure 2:
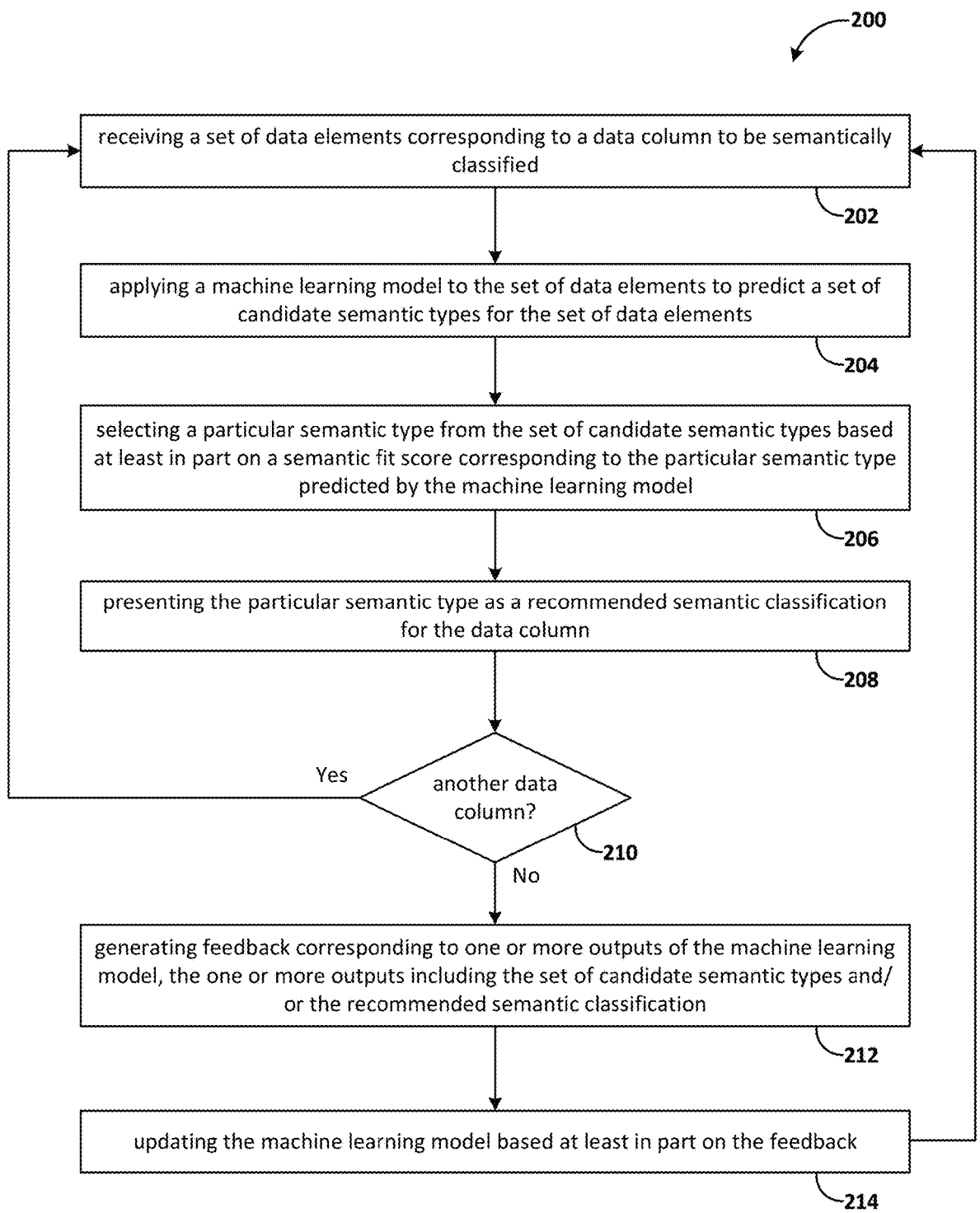
FIG. 2 illustrates example operations associated with semantic classification of sets of data elements in accordance with one or more embodiments.

Referring now to FIG. 2, example operations 200 associated with an example system are further described. The operations 200 described with reference to FIG. 2 may be associated with one or more components of the system. For example, the operations 200 described with reference to FIG. 2 may include operations of a semantic classification management system as described with reference to FIG. 1. One or more operations described with reference to FIG. 2 may be modified, rearranged, or omitted all together. Accordingly, the particular sequence of operations described with reference to FIG. 2 should not be construed as limiting the scope of one or more embodiments.

As shown in FIG. 2, example operations 200 may include operations associated with semantic classification of sets of data elements, such as data columns. In one example, the operations 200 may include, at block 202, receiving a set of data elements corresponding to a data column to be semantically classified. At block 204, the operations 200 may include applying a machine learning model to the set of data elements to predict a set of candidate semantic types for the set of data elements. The set of candidate semantic types may include, for each data element of the set of data elements, at least one candidate semantic type corresponding to the data element. At block 206, the operations 200 may include selecting a particular semantic type from the set of candidate semantic types based at least in part on a semantic fit score corresponding to the particular semantic type predicted by the machine learning model. At block 208, the operations 200 may include presenting the particular semantic type as a recommended semantic classification for the data column. At block 210, the operations 200 may include determining whether there is another data column. When there is another data column, the operations 200 may return to block 202. When there are no further data columns, the operations may proceed to block 212.

At block 212, the operations 200 may include generating feedback corresponding to one or more outputs of the machine learning model. The feedback may correspond to one or more outputs for at least one dataset that includes one or more data columns. The one or more outputs may include the set of candidate semantic types predicted by the machine learning model. Additionally, or in the alternative, one or more outputs may include the recommended semantic classification for the data column presented by the machine learning model. At block 214, the operations 200 may include updating the machine learning model based at least in part on the feedback. In one example, training data may be generated based on the feedback, as described above. From block 214, the operations 200 may return to block 202, and, at block 202, the operations 200 may proceed with respect to another dataset and/or another data column based on an updated version of the machine learning model.

4. EXAMPLE SEMANTIC CLASSIFICATION RECOMMENDATIONS

Figure 3B:
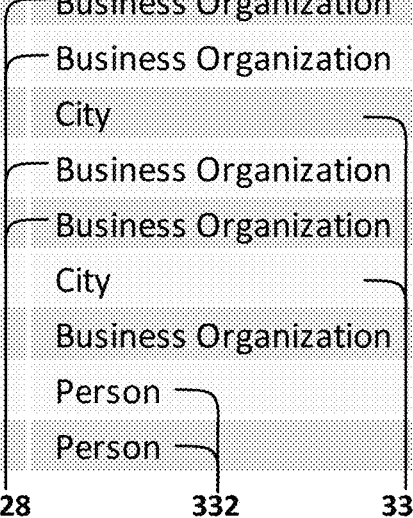
FIG. 3B illustrates an example semantic-type prediction that may be generated by a semantic classification management system in accordance with one or more embodiments.
Figure 3C:
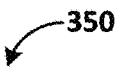
FIG. 3C illustrates an example semantic classification recommendation that may be generated by a semantic classification management system in accordance with one or more embodiments.
Figure 4:
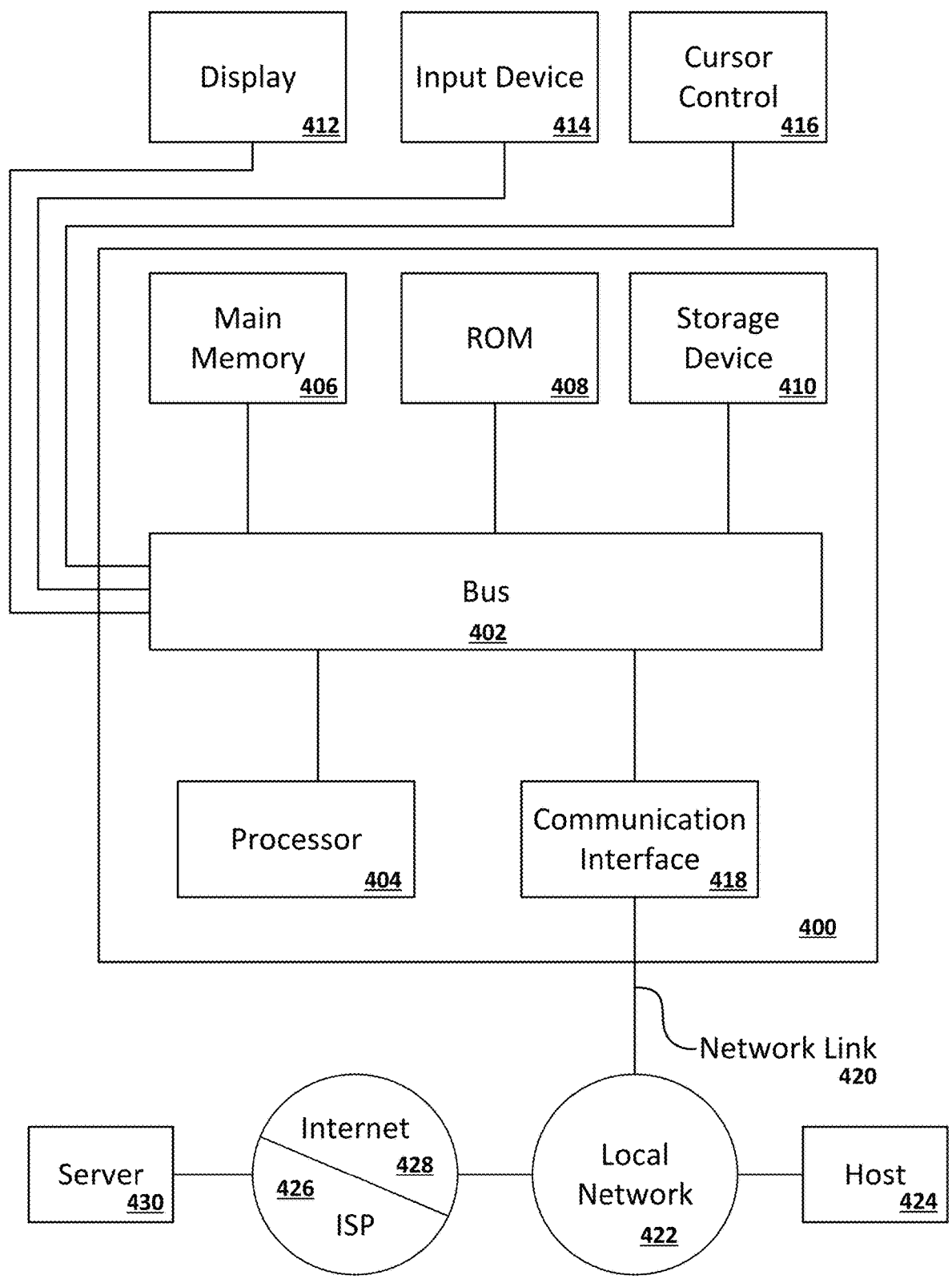
FIG. 4 shows a block diagram that illustrates a computer system in accordance with one or more embodiments.

Referring now to FIGS. 3A-3C, example recommended semantic classifications are further described. FIG. 3A shows an example semantic-type dataset 300. The semantic-type dataset 300 includes an example of a plurality of semantic types 302 that may be selected as candidate semantic types for various data elements. In one example, a machine learning model 118 may reference a semantic-type dataset 300 when predicting a set of candidate semantic types for a set of data elements. For example, the candidate semantic types predicted by the machine learning model 118 may be included in the semantic-type dataset 300. Additionally, or in the alternative, the predictions made by the machine learning model 118 may be limited to semantic types 302 that are included in the semantic-type dataset 300. In one example, the machine learning model 118 may reference different semantic-type datasets 300 for different contexts.

FIG. 3B shows an example semantic-type prediction 320 generated by a semantic classification management system, such as by a machine learning model of the semantic classification management system. As shown in FIG. 3B, the semantic-type prediction 320 may include a set of data elements 322 corresponding to a data column to be semantically classified, a set of predicted candidate semantic types 324 corresponding to the set of data elements 322, and a set of confidence levels 326 corresponding to the set of predicted candidate semantic types 324. For each data element 322, the semantic-type prediction 320 may include at least one predicted candidate semantic type 324. For each predicted candidate semantic type 324, the semantic-type prediction 320 may include at least one confidence level. As shown in FIG. 3B, a first predicted candidate semantic type 328, "Business Organization," may have an occurrence frequency of 0.44 (e.g., 4/9=0.44). A second predicted candidate semantic type 330, "City," may have an occurrence frequency of 0.22 (e.g., 2/9=0.22). A third predicted candidate semantic type 332, "Person," may have an occurrence frequency of 0.22 (e.g., 2/9=0.22).

In one example, the semantic-type prediction 320 may include one or more erroneous predictions. A second predicted candidate semantic type 330, "City," may be erroneously predicted for data elements that are not cities. For example, the data elements 322 corresponding to the second predicted candidate semantic type 330 may be business organizations that are named after cities. A third predicted candidate semantic type 332, "Person," may be erroneously predicted for data elements that are not persons. For example, the data elements 322 corresponding to the third predicted candidate semantic type 332 may be business organizations that are named after persons. Notwithstanding some erroneous candidate semantic types in the semantic-type prediction 320, the semantic classification management system may generate an accurate semantic classification for the database column to be semantically classified.

FIG. 3C shows an example semantic classification recommendation 350 generated by a semantic classification management system, such as by a semantic scoring engine of the semantic classification management system. The semantic classification recommendation 350 may include a set of candidate recommended semantic classifications 352, and a set of semantic fit scores 354 corresponding to the set of candidate recommended semantic classifications 352. The semantic scoring engine may select a recommended semantic classification 356, for example, from the set of candidate recommended semantic classifications 352, based at least in part on the particular semantic fit scores 358 corresponding to the recommended semantic classification 356. In one example, as shown in FIG. 3C, a semantic fit score for the semantic type "Business Organization" may be calculated as 4.95/8.9=0.56. The semantic classification management system may select the semantic type "Business Organization" as a recommended semantic classification based on the semantic fit core of 0.56 being higher than the semantic fit scores for each of the other candidate semantic classifications (e.g., 0.22 for "City" and 0.22 for "Person.") In one example, the recommended semantic classification 356 may be selected based at least in part on having a highest semantic fit scores 358 from among the set of semantic fit scores 354.

5. EXAMPLE PRACTICAL APPLICATIONS

A. Identification of Personal Information.

In one example, a system may identify personal information in a dataset based at least in part on a recommended semantic classification for one or more data columns of the dataset. A semantic classification management system may determine that a recommended semantic classification for a data column is associated with a personal information classification. The semantic classification management system may identify the data column as containing one or more items of personal information.

In one example, a semantic classification management system may determine that one or more data columns are associated with a data breach. The data breach may be identified prior to or after the semantic classification management system generates the recommended semantic classification for the one or more data columns. The semantic classification management system may generate an alert, based at least in part on the data column having been identified as containing the one or more items of personal information, indicating that the data breach includes the one or more items of personal information.

In one example, the semantic classification management system may identify a data column as containing one or more items of personal information based at least in part on a semantic fit score meeting a threshold semantic fit score. For example, a column may be identified as containing personal information when the semantic fit score for the semantic classification meets the threshold semantic fit score. Additionally, or in the alternative, a column that has a semantic classification that is associated with a personal information classification and that has a semantic fit score that falls below the threshold semantic fit score may not be identified as containing personal information based at least in part on the semantic fit score failing to meet the threshold semantic fit score.

In one example, the semantic classification management system may identify a data column as containing one or more items of personal information based at least in part on a candidate semantic type for a data column that differs from the particular semantic type presented as the recommended semantic classification for the data column. For example, the semantic classification management system may identify a data column as containing personal information based on a first candidate semantic type, and the semantic classification management system may present a second candidate semantic type as the recommended semantic classification for the data column.

In one example, the semantic classification management system may identify one or more data columns as containing non-personal information. For example, the semantic classification management system may identify a data column as containing non-personal information in response to determining an occurrence of a data breach. The semantic classification management system may determine that a data column contains non-personal information based at least in part on a candidate semantic type associated with the data column having a semantic fit score that meets a threshold semantic fit score. The semantic classification management system may determine a semantic fit score for a candidate semantic type that is predicted for a data column and that is associated with non-personal information. The semantic classification management system may compare the first semantic fit score to a threshold semantic fit score, and may identify the data column as containing non-personal information based at least in part on the semantic fit score meeting the threshold semantic fit score. In one example, the semantic classification management system may generate an alert, based at least in part on the data column having been identified as containing non-personal information, indicating that the data column and/or the data breach includes non-personal information.

B. Schema Matching.

In one example, a system may perform one or more operations associated with schema matching based at least in part on a recommended semantic classification for one or more schema elements. The schema elements may include tables, columns, attributes, classes, or other structural components of data representations. For example, a schema element may include one or more data columns of a dataset. A semantic classification management system may determine a semantic similarity between a recommended semantic classification for a data column and one or more additional schema elements.

In one example, a semantic classification management system may determine connections between elements in different database schemas or datasets based on the semantic classification. Additionally, or in the alternative, the semantic classification management system may determine similarities and/or dissimilarities between elements in different database schemas or datasets based on semantic classification. Further, the semantic classification management system may determine a quality of schema matching for elements that are already matched with one another.

In one example, the semantic classification management system may determine a semantic similarity between different schema elements. For a first schema element, such as a set of data elements in a column, that has a semantic similarity that meets a threshold semantic similarity with respect to a second schema element, the semantic classification management system may present the first schema element as being semantically related to the second schema element. Additionally, or the alternative, for a third schema element that has a semantic similarity that does not meet the threshold semantic similarity with respect to the second schema element, the semantic classification management system may present the third schema element as being semantically unrelated to the second schema element. As used herein, the term "semantic similarity" refers to a degree of likeness or resemblance between the meaning of a plurality of data elements. Semantic similarity may represent how closely two data elements are related to one another even though the data elements have different content, such as different words or phrases. In one example, the semantic classification management system may merge a first schema element (e.g., a first column that includes a first set of data elements) and a second schema element (e.g., a second column that includes a second set of data elements) based on semantic similarity. Additionally, or in the alternative, the semantic classification management system may define a relationship between a first schema element (e.g., a first column that includes a first set of data elements) and a second schema element (e.g., a second column that includes a second set of data elements) based on semantic similarity. Example relationships that the semantic classification management system may define between respective schema elements may include a primary key-foreign key relationship, a one-to-one relationship, a one-to-many relationship, a many-to-one relationship, a many-to-many relationship, an inheritance relationship, an aggregate relationship, or an association relationship.

For a one-to-one relationship, a first schema element (e.g., a first column that includes a first set of data elements) is associated with one, and only one, other schema element (e.g., a second column that includes a second set of data elements). For example, a first data column in a first table may be associated with one and only one record in the second table, and vice versa.

For a one-to-many relationship, a first schema element (e.g., a first column that includes a first set of data elements) is associated with multiple other schema element (e.g., multiple other sets of data elements). In one example, a one-to-many relationship may include a parent-child relationships, such as a customer (parent) and multiple orders (children) associated with the customer. For a many-to-one relationship, multiple schema elements (e.g., multiple other sets of data elements) are associated with one, and only one, other schema element (e.g., a first column that includes a first set of data elements). In one example, a many-to-one relationship may include a child-parent relationships, such as multiple customers (children) that are associated with a particular sales representative (parent).

For a many-to-many relationship, a first set of schema elements (e.g., a first set that includes multiple subsets of data elements) are associated with a second set of schema elements (e.g., a second set that includes multiple subsets of data elements). In one example, a many-to-many relationship may include a child-child relationships, such as multiple customers (children) that are associated with multiple product types (children).

For an inheritance relationship, a first schema element (e.g., a first column that includes a first set of data elements) inherits an attribute, such as a semantic classification, of a second schema element (e.g., a second column that includes a second set of data elements). IN one example, an inheritance relationship may include a type (e.g., vehicle) that is inherited by one or more subtypes (e.g., car, truck, etc.).

In one example, the semantic classification management system may determine a primary key (PK) to foreign key (FK) relationship between schema elements. The primary key is a unique identifier within a database table. Each row or record in the table may have a distinct and identifiable primary key. In one example, a "Customers" table may have a "CustomerID" column that is the primary key for the table, thus ensuring that each customer has a unique identifier. The foreign key is a column or a set of columns that reference the primary key. The foreign key establishes a link between tables. In one example, in an "Orders" table, the "CustomerID" column may be an FK, linking each order to a specific customer through their unique CustomerID. In one example, the semantic classification management system may identify a first schema element in a first table as a foreign key and a second schema element in a second table as a primary key based on semantic similarity between the first schema element and the second schema element.

C. Data Cleansing.

In one example, a system may perform one or more operations associated with data cleansing based at least in part on a recommended semantic classification for one or more data columns of the dataset. A semantic classification management system may determine that a semantic fit score for one or more candidate semantic types is below a threshold semantic fit score. A data column that has candidate semantic types with a low semantic fit score may indicate that the data column includes data elements that do not belong in the data column. The semantic classification management system may present a data column as a candidate for data cleansing based at least in part on the semantic fit score for one or more candidate semantic types associated with the data column being below the threshold semantic fit score.

Additionally, or in the alternative, the semantic classification management system may identify misplaced data elements based on a confidence level of the candidate semantic type associated with the respective data element. The semantic classification management system may identify data elements that have a confidence level that is below a threshold confidence level. The semantic classification management system may determine that such data elements are misplaced with respect to other data elements in the data column based on the confidence level being below the threshold confidence level. The semantic classification management system may present data elements as candidates for data cleansing based at least in part on the confidence level being below the threshold confidence level.

Additionally, or in the alternative, the semantic classification management system may identify data elements that (a) have a candidate semantic type with a confidence level that meet a threshold confidence level and that (b) is a different candidate semantic type relative to a threshold proportion of other data elements in the data column. The semantic classification management system may determine that such data elements are misplaced with respect to other data elements in the data column based on the different candidate semantic type having a confidence level that meets the threshold confidence level. The semantic classification management system may present data elements as candidates for data cleansing based at least in part on the different candidate semantic type having a confidence level that meets the threshold confidence level.

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. MICROSERVICE APPLICATIONS

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally, or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

9. MISCELLANEOUS; EXTENSIONS

Embodiments are directed to a system with one or more devices that include a hardware processor and that are configured to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:

determining that a dataset is associated with a data breach;

responsive at least in part to determining that the dataset is associated with the data breach:

executing a semantic classification process to determine whether one or more data columns of the dataset comprise personal information, the semantic classification process comprising:

receiving a set of data elements corresponding to a first data column;

applying a machine learning model to the set of data elements to predict a set of candidate semantic types for the set of data elements, wherein the set of candidate semantic types comprises, for a particular data element of the set of data elements, at least one candidate semantic type corresponding to the particular data element;

determining that a first semantic fit score corresponding to a first candidate semantic type, of the set of candidate semantic types, meets a threshold semantic fit score; and based on (a) the first candidate semantic type being associated with a personal information classification and (b) determining that the first semantic fit score corresponding to the first candidate semantic type meets the threshold semantic fit score;

assigning the personal information classification to at least one of the dataset or the first data column;

generating an alert indicating that the personal information classification is assigned to the at least one of the dataset or the first data column;

presenting the first candidate semantic type as a recommended semantic classification for the first data column and the alert for display on a user interface.

2. The media of claim 1, wherein the operations further comprise:

generating the set of data elements at least in part by transforming structured data into unstructured data.

3. The media of claim 1, wherein the first semantic fit score is based at least in part on an occurrence frequency of the first candidate semantic type in the set of candidate semantic types predicted by the machine learning model.

4. The media of claim 3, wherein the operations further comprise:

determining that the occurrence frequency of the first candidate semantic type meets a threshold occurrence frequency; and selecting the first candidate semantic type from the set of candidate semantic types based at least in part on the occurrence frequency meeting the threshold occurrence frequency.

5. The media of claim 1, wherein the first semantic fit score is based at least in part on a confidence level for the first candidate semantic type, wherein the confidence level represents a degree of confidence that the first candidate semantic type predicted for a first data element, of the set of data elements, accurately represents a semantic meaning of the first data element.

6. The media of claim 5, wherein the operations further comprise:
determining that the confidence level for the first candidate semantic type meets a threshold confidence level; and
selecting the first candidate semantic type from the set of candidate semantic types based at least in part on the confidence level meeting the threshold confidence level.

7. The media of claim 1, wherein the operations further comprise:
determining, for each candidate semantic type of the set of candidate semantic types, a candidate semantic fit score corresponding to a particular candidate semantic type; and
determining that a first candidate semantic fit score, corresponding to the first candidate semantic type is a highest candidate semantic fit score with respect to the set of candidate semantic types; and
assigning the first candidate semantic type to a first data element, of the set of data elements, based at least in part on the first candidate semantic fit score being the highest candidate semantic fit score with respect to the set of candidate semantic types.

8. The media of claim 7, wherein, for the first candidate semantic type, determining the candidate semantic fit score comprises:
computing, for each particular data element of the set of data elements, a confidence level for the particular candidate semantic type having been predicted for the particular data element of the set of data elements;
computing a denominator comprising a first sum of each particular confidence level corresponding to each particular data element of the set of data elements;
computing a numerator comprising a second sum of each particular confidence level corresponding to each occurrence of the first candidate semantic type having been predicted; and
computing a quotient comprising the numerator divided by the denominator, wherein the quotient is the first candidate semantic fit score corresponding to the first candidate semantic type.

9. The media of claim 1, wherein the operations further comprise:
determining, for each particular candidate semantic type of the set of candidate semantic types, a particular semantic fit score corresponding to a particular candidate semantic type;
comparing each particular semantic fit score to the threshold semantic fit score; and
selecting a plurality of particular semantic types from the set of candidate semantic types, wherein a particular semantic type of the plurality of particular semantic types is selected based at least in part on the particular semantic fit score corresponding to the particular semantic type meeting the threshold semantic fit score; and
presenting each particular semantic type of the plurality of particular semantic types as a candidate recommended semantic classification for the first data column.

10. The media of claim 1, wherein the operations further comprise:
determining, for a second data column, that a second candidate semantic type, of the set of candidate semantic types, is associated with a non-personal information classification;
determining a second semantic fit score corresponding to the second candidate semantic type;
comparing the second semantic fit score to the threshold semantic fit score;
identifying the second data column as containing non-personal information based at least in part on the second semantic fit score failing to meet the threshold semantic fit score.

11. The media of claim 10, wherein the operations further comprise:
generating a notification, based at least in part on the second data column having been identified as containing non-personal information, indicating that the second data column includes non-personal information.

12. The media of claim 1, wherein the operations further comprise:
receiving feedback corresponding to one or more outputs of the machine learning model; and
updating the machine learning model based at least in part on the feedback;
wherein the one or more outputs of the machine learning model comprises at least one of: the set of candidate semantic types predicted by the machine learning model, or the first candidate semantic type presented as the recommended semantic classification for the first data column.

13. The media of claim 1, wherein the operations further comprise:
training the machine learning model, based on one or more initial supervised learning datasets, to predict candidate semantic types for data elements; and
retraining the machine learning model based on one or more subsequent supervised learning datasets, wherein at least one of the one or more subsequent supervised learning datasets is based at least in part on feedback corresponding to at least one of: the set of candidate semantic types predicted by the machine learning model, or the first candidate semantic type presented as the recommended semantic classification for the first data column.

14. The media of claim 1, wherein the operations further comprise:
determining a semantic similarity between the recommended semantic classification for the first data column and at least one schema element;
determining that the semantic similarity meets a threshold semantic similarity; and
presenting the set of data elements corresponding to the first data column as being semantically related to the at least one schema element based at least in part on the semantic similarity meeting the threshold semantic similarity.

15. The media of claim 1, wherein the operations further comprise:
determining that a second semantic fit score corresponding to a second candidate semantic type, of the set of candidate semantic types, is below the threshold semantic fit score; and
presenting the set of data elements corresponding to the first data column as being a candidate for data cleansing based at least in part on the second semantic fit score being below the threshold semantic fit score.

16. A method, comprising:
determining that a dataset is associated with a data breach;
responsive at least in part to determining that the dataset is associated with the data breach:

executing a semantic classification process to determine whether one or more data columns of the dataset comprise personal information, the semantic classification process comprising:
  receiving a set of data elements corresponding to a first data column;
  applying a machine learning model to the set of data elements to predict a set of candidate semantic types for the set of data elements, wherein the set of candidate semantic types comprises, for a particular data element of the set of data elements, at least one candidate semantic type corresponding to the particular data element;
  determining that a first semantic fit score corresponding to a first candidate semantic type, of the set of candidate semantic types, meets a threshold semantic fit score; and
  based on (a) the first candidate semantic type being associated with a personal information classification and (b) determining that the first semantic fit score corresponding to the first candidate semantic type meets the threshold semantic fit score:
    assigning the personal information classification to at least one of the dataset or the first data column;
    generating an alert indicating that the personal information classification is assigned to the at least one of the dataset or the first data column;
    presenting the first candidate semantic type as a recommended semantic classification for the first data column and the alert for display on a user interface;
wherein the method is performed by at least one device including a hardware processor.

17. The method of claim 16, further comprising:
generating the set of data elements at least in part by transforming structured data into unstructured data.

18. The method of claim 16, wherein the first semantic fit score is based at least in part on an occurrence frequency of the first candidate semantic type in the set of candidate semantic types predicted by the machine learning model.

19. The method of claim 18, further comprising:
determining that the occurrence frequency of the first candidate semantic type meets a threshold occurrence frequency; and
selecting the first candidate semantic type from the set of candidate semantic types based at least in part on the occurrence frequency meeting the threshold occurrence frequency.

20. The method of claim 16, wherein the first semantic fit score is based at least in part on a confidence level for the first candidate semantic type,
wherein the confidence level represents a degree of confidence that the first candidate semantic type predicted for a first data element, of the set of data elements, accurately represents a semantic meaning of the first data element.

21. The method of claim 20, further comprising:
determining that the confidence level for the first candidate semantic type meets a threshold confidence level; and
selecting the first candidate semantic type from the set of candidate semantic types based at least in part on the confidence level meeting the threshold confidence level.

22. The method of claim 16, further comprising:
determining, for each candidate semantic type of the set of candidate semantic types, a candidate semantic fit score corresponding to a particular candidate semantic type; and
determining that a first candidate semantic fit score, corresponding to the first candidate semantic type is a highest candidate semantic fit score with respect to the set of candidate semantic types; and
assigning the first candidate semantic type to a first data element, of the set of data elements, based at least in part on the first candidate semantic fit score being the highest candidate semantic fit score with respect to the set of candidate semantic types.

23. The method of claim 22, wherein, for the first candidate semantic type, determining the candidate semantic fit score comprises:
computing, for each particular data element of the set of data elements, a confidence level for the particular candidate semantic type having been predicted for the particular data element of the set of data elements;
computing a denominator comprising a first sum of each particular confidence level corresponding to each particular data element of the set of data elements;
computing a numerator comprising a second sum of each particular confidence level corresponding to each occurrence of the first candidate semantic type having been predicted; and
computing a quotient comprising the numerator divided by the denominator, wherein the quotient is the first candidate semantic fit score corresponding to the first candidate semantic type.

24. The method of claim 16, further comprising:
determining, for each particular candidate semantic type of the set of candidate semantic types, a particular semantic fit score corresponding to a particular candidate semantic type;
comparing each particular semantic fit score to the threshold semantic fit score; and
selecting a plurality of particular semantic types from the set of candidate semantic types, wherein a particular semantic type of the plurality of particular semantic types is selected based at least in part on the particular semantic fit score corresponding to the particular semantic type meeting the threshold semantic fit score; and
presenting each particular semantic type of the plurality of particular semantic types as a candidate recommended semantic classification for the first data column.

25. The method of claim 16, further comprising:
determining, for a second data column, that a second candidate semantic type, of the set of candidate semantic types, is associated with a non-personal information classification;
determining a second semantic fit score corresponding to the second candidate semantic type;
comparing the second semantic fit score to the threshold semantic fit score;
identifying the second data column as containing non-personal information based at least in part on the second semantic fit score failing to meet the threshold semantic fit score.

26. The method of claim 25, further comprising:
generating a notification, based at least in part on the second data column having been identified as containing non-personal information, indicating that the second data column includes non-personal information.

27. The method of claim 16, further comprising:
receiving feedback corresponding to one or more outputs of the machine learning model; and
updating the machine learning model based at least in part on the feedback;
wherein the one or more outputs of the machine learning model comprises at least one of: the set of candidate semantic types predicted by the machine learning model, or the first candidate semantic type presented as the recommended semantic classification for the first data column.

28. The method of claim 16, further comprising:
training the machine learning model, based on one or more initial supervised learning datasets, to predict candidate semantic types for data elements; and
retraining the machine learning model based on one or more subsequent supervised learning datasets, wherein at least one of the one or more subsequent supervised learning datasets is based at least in part on feedback corresponding to at least one of: the set of candidate semantic types predicted by the machine learning model, or the first candidate semantic type presented as the recommended semantic classification for the first data column.

29. The method of claim 16, further comprising:
determining a semantic similarity between the recommended semantic classification for the first data column and at least one schema element;
determining that the semantic similarity meets a threshold semantic similarity; and
presenting the set of data elements corresponding to the first data column as being semantically related to the at least one schema element based at least in part on the semantic similarity meeting the threshold semantic similarity.

30. The method of claim 16, further comprising:
determining that a second semantic fit score corresponding to a second candidate semantic type, of the set of candidate semantic types, is below the threshold semantic fit score; and
presenting the set of data elements corresponding to the first data column as being a candidate for data cleansing based at least in part on the second semantic fit score being below the threshold semantic fit score.

31. A system comprising:
at least one hardware processor;
the system being configured to execute operations, using the at least one hardware processor, the operations comprising:
  determining that a dataset is associated with a data breach;
  responsive at least in part to determining that the dataset is associated with the data breach:
    executing a semantic classification process to determine whether one or more data columns of the dataset comprise personal information, the semantic classification process comprising:
      receiving a set of data elements corresponding to a first data column;
      applying a machine learning model to the set of data elements to predict a set of candidate semantic types for the set of data elements, wherein the set of candidate semantic types comprises, for a particular data element of the set of data elements, at least one candidate semantic type corresponding to the particular data element;
      determining that a first semantic fit score corresponding to a first candidate semantic type, of the set of candidate semantic types, meets a threshold semantic fit score; and
      based on (a) the first candidate semantic type being associated with a personal information classification and (b) determining that the first semantic fit score corresponding to the first candidate semantic type meets the threshold semantic fit score:
        assigning the personal information classification to at least one of the dataset or the first data column;
        generating an alert indicating that the personal information classification is assigned to the at least one of the dataset or the first data column;
        presenting the first candidate semantic type as a recommended semantic classification for the first data column and the alert for display on a user interface.

32. The system of claim 31, wherein the operations further comprise:
generating the set of data elements at least in part by transforming structured data into unstructured data.

33. The system of claim 31, wherein the first semantic fit score is based at least in part on an occurrence frequency of the first candidate semantic type in the set of candidate semantic types predicted by the machine learning model.

34. The system of claim 33, wherein the operations further comprise:
determining that the occurrence frequency of the first candidate semantic type meets a threshold occurrence frequency; and
selecting the first candidate semantic type from the set of candidate semantic types based at least in part on the occurrence frequency meeting the threshold occurrence frequency.

35. The system of claim 31, wherein the first semantic fit score is based at least in part on a confidence level for the first candidate semantic type,
wherein the confidence level represents a degree of confidence that the first candidate semantic type predicted for a first data element, of the set of data elements, accurately represents a semantic meaning of the first data element.

36. The system of claim 35, wherein the operations further comprise:
determining that the confidence level for the first candidate semantic type meets a threshold confidence level; and
selecting the first candidate semantic type from the set of candidate semantic types based at least in part on the confidence level meeting the threshold confidence level.

37. The system of claim 31, wherein the operations further comprise:
determining, for each candidate semantic type of the set of candidate semantic types, a candidate semantic fit score corresponding to a particular candidate semantic type; and
determining that a first candidate semantic fit score, corresponding to the first candidate semantic type is a highest candidate semantic fit score with respect to the set of candidate semantic types; and
assigning the first candidate semantic type to a first data element, of the set of data elements, based at least in part on the first candidate semantic fit score being the highest candidate semantic fit score with respect to the set of candidate semantic types.

38. The system of claim 37, wherein, for the first candidate semantic type, determining the candidate semantic fit score comprises:

computing, for each particular data element of the set of data elements, a confidence level for the particular candidate semantic type having been predicted for the particular data element of the set of data elements;

computing a denominator comprising a first sum of each particular confidence level corresponding to each particular data element of the set of data elements;

computing a numerator comprising a second sum of each particular confidence level corresponding to each occurrence of the first candidate semantic type having been predicted; and computing a quotient comprising the numerator divided by the denominator, wherein the quotient is the first candidate semantic fit score corresponding to the first candidate semantic type.

39. The system of claim 31, wherein the operations further comprise:

determining, for each particular candidate semantic type of the set of candidate semantic types, a particular semantic fit score corresponding to a particular candidate semantic type;

comparing each particular semantic fit score to the threshold semantic fit score; and selecting a plurality of particular semantic types from the set of candidate semantic types, wherein a particular semantic type of the plurality of particular semantic types is selected based at least in part on the particular semantic fit score corresponding to the particular semantic type meeting the threshold semantic fit score; and presenting each particular semantic type of the plurality of particular semantic types as a candidate recommended semantic classification for the first data column.

* * * * *